CONVERSION APPARATUS AND SYSTEMS

Filed March 9, 1960

*INVENTOR.*
PAUL J. GARDNER
*BY* Roger W. Nolan Jr.
ATTORNEY

United States Patent Office 3,046,751

Patented July 31, 1962

3,046,751
CONVERSION APPARATUS AND SYSTEMS

Paul J. Gardner, Davenport, Iowa, assignor to The Bendix Corporation, a corporation of Delaware Filed Mar. 9, 1960, Ser. No. 13,806
12 Claims. (Cl. 62—52)

This invention relates to conversion apparatus and systems and more particularly to self contained liquid oxygen to gaseous oxygen conversion systems for use in a zero gravity environment and in inverted positions.

Present liquid to gas conversion systems will not operate when placed in an inverted position or when subjected to a zero gravity environment. These conditions will exist, for example, when liquid oxygen is to be used in conjunction with breathing apparatus for under water and space flight breathing, respectively.

An object of the invention is to provide a liquid to gas conversion system which will operate in an inverted position under normal environmental conditions and which will operate in a zero gravity environment in addition to being operable in the normal position under normal environmental conditions.

Conventional liquid to gas conversion systems depend in part upon the characteristic of weight, convection, up and down, head pressure, and syphon effect for operation. These characteristics are absent in a zero gravity environment and certain of them are absent when the conversion system is inverted under normal environmental conditions. The loss of physical characteristics in zero gravity environment outnumbers and includes all of the operational characteristics lost when the system is inverted under normal environmental conditions; therefore, for the purposes of clarity and simplification, the disclosure will primarily refer to a liquid to gas conversion system for use in a zero gravity environment but should not be considered to be limited thereto.

Storage vessels used in conventional liquid to gas conversion systems have a liquid port and a gas port and depend upon the liquid disposed therein to be orientated so that it is exposed to the liquid port at all times. The location of these ports are fixed in the container. If the container is reorientated the liquid content may cover the gas port and the gas content may appear adjacent to the liquid port. In a zero gravity environment either liquid or gas may appear adjacent to either or both ports. In a zero gravity environment control of the liquid orientation, heat input (vaporization) and the pressure build-up of the unstabilized system is necessary and may be accomplished by advantageous use of the liquid properties of surface tension and heat capacity.

Another object of the invention is to provide a liquid to gas conversion system which will operate in a zero gravity environment by utilizing the molecular (adhesive and cohesive) properties and heat capacity properties of of the liquid.

A further object of the invention is to provide a liquid to gas conversion system which will operate in a zero gravity environment whereby the liquid supply is confined in a flexible container which will control the liquid orientation, heat input, and the pressure build-up of the system.

A still further object of the invention is to provide a liquid oxygen to gaseous oxygen conversion system which will operate in a zero gravity environment wherein the liquid oxygen is confined in a flexible semi-permeable container which will minimize heat conduction and increase surface adhesion.

Certain of these objects and advantages are realized in the invention by the provision of flexible means for controlling liquid orientation of liquid oxygen, the heat input to liquid oxygen and the pressure build-up of liquid oxygen and means for converting liquid oxygen to gaseous oxygen at a rate commensurate with gaseous oxygen demand.

The foregoing and other objects and advantages of the invention will appear more fully hereinafter from a consideration of the detailed description which follows; taken together with the accompanying drawing wherein an embodiment of the invention is illustrated. It is to be expressly understood, however, that the drawing is for the purpose of illustration and description and is not to be construed as defining the limits of the invention.

Figures 1, 2:
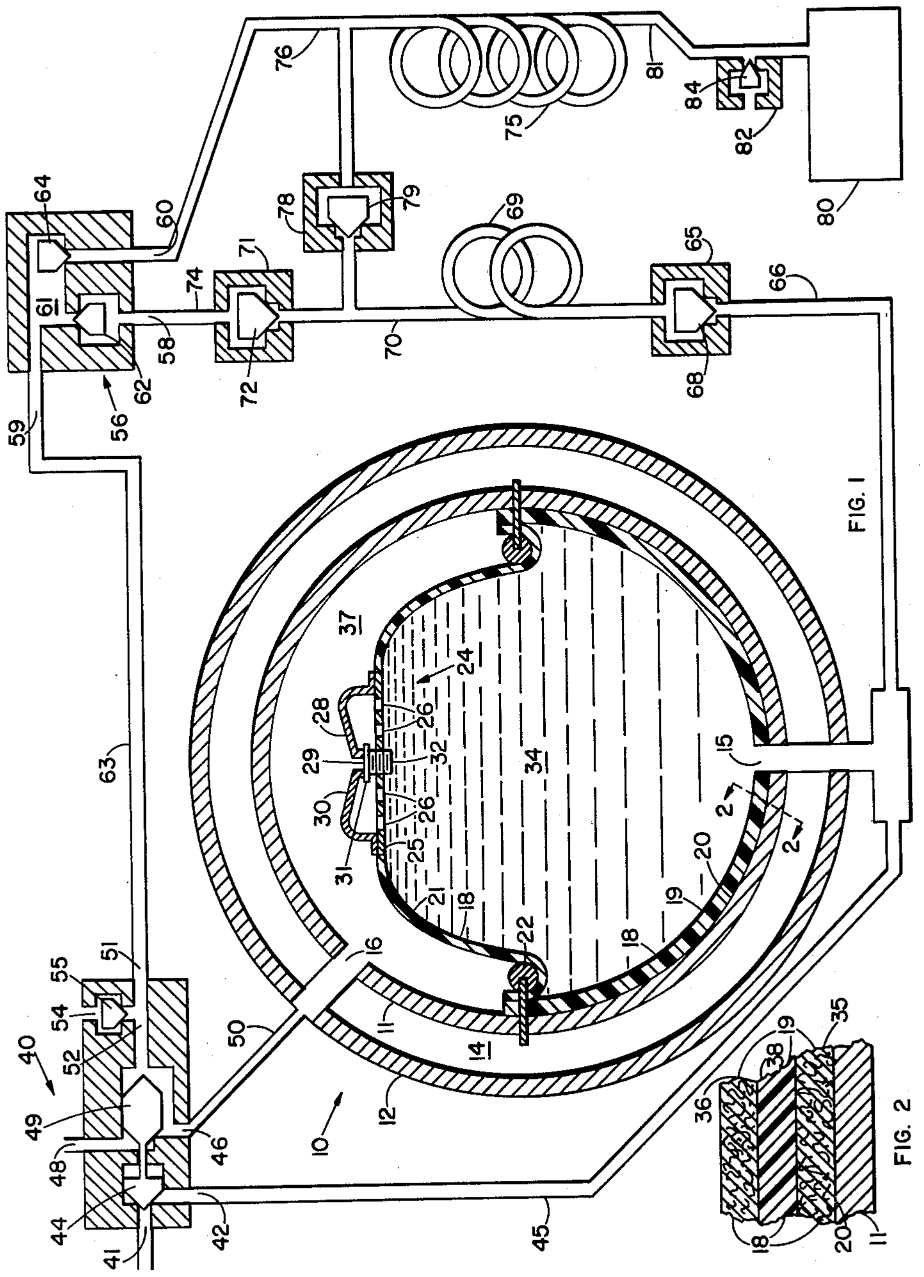
FIG. 1 is a schematic drawing of a liquid to gas conversion system embodying the inventive conversion apparatus.
FIG. 2 is a detailed cross sectional view of a portion of the conversion apparatus illustrated in FIG. 1.

Referring now to the drawing and FIG. 1, numeral 10 designates a liquid oxygen container having an inner container 11 and an outer container 12 forming evacuated chamber 14. Liquid port 15 is disposed at the bottom of container 10 and gas port 16 is disposed at the top of container 10.

Means for separating inner container 11 into two compartments is disposed within container 11 and advantageously comprises flexible, semi-permeable container or separator 18 composed of a synthetic resin. The lower section 19 of container 18 lines the lower half of the inner wall 20 of inner container 11 and upper section 21 of container 18 is movable within container 11. Lower section 19 and upper section 21 are joined at their periphery and are held against the inner wall 20 of container 11 by means of an annular fastening device 22. The upper section 21 of container 18 has an opening therein for insertion of relief valve 24. Base plate 25 of relief valve 24 is joined at its periphery to upper section 21 and has relief holes 26 formed therethrough. Diaphragm 28 is joined to plate 25 at its periphery and has relief port 29 in the center thereof forming valve seat 30. Adjustable valve head 31 is held against valve seat 30 by means of an adjusting screw 32 rotatably movable through base plate 25.

Liquid oxygen 34 is disposed in flexible container 18 and gaseous oxygen 37 is disposed in the area between the upper section 21 of container 18 and inner container 16.

Referring now to FIG. 2 there is shown in section a portion of inner container 11 and flexible container 18. Flexible semi-permeable container 18 may, and does in the preferred form, comprise three layers, an outer layer 35 and inner layer 36 of a felt of synthetic resin and middle layer 38 of a film of synthetic resin. Advantageously the synthetic resin employed may be tetrafluoroethylene which has substantial flexibility at the very frigid temperatures of liquid oxygen. Tetrafluoroethylene is ordinarily a non-permeable material but becomes semi-permeable after a small amount of flexing at the temperatures of liquid oxygen when small pin holes develop through the material. The amount of permeability required for container 18 is dependent upon the heat input to the liquid oxygen, increased permeability may be accomplished by putting pin holes through the container. The permeability of container 18 must be sufficient to allow liquid to cover the outer layer 35 and to permit all liquid vaporization to occur at the outer surface.

The physical properties of semi-permeable container 18 and the properties of the liquid oxygen 34 in a zero gravity environment together with the system components combine to provide the novel oxygen conversion system. Liquid, and in particular liquid oxygen, has molecular attractive properties (the result of mass cohesion or adhesion) and heat capacity properties (the thermal conductivity of the liquid) in a zero gravity environment.

Surface tension and, therefore, the capillary phenomenon will exist in the absence of a gravitational field since the basic property of molecular attraction remains. The molecular attraction of two like molecular masses is cohesion, the molecular attraction of two unlike molecular masses is adhesion. The actual energy associated with surface tension exists as energy per unit area or surface energy. Surface energy is a consequence of internal pressure, an effect of molecular attraction, cohesion. A liquid without the influence of surface adhesion should assume the shape of a perfect sphere in a weightless environment. The potential energy to retain this shape is a function of the internal molecular cohesion and the surface energy of cohesion.

The heat capacity of a liquid and in particular liquid oxygen is not lost in a zero gravity environment, that is, the liquid will have the capacity to absorb heat. Therefore, by conduction, heat energy may be transferred between neighboring volume elements by virtue of the temperature difference between them.

The molecular attractive properties are utilized in the zero gravity system shown in FIG. 1 and in particular with the flexible semi-permeable container 18. The liquid 34 is disposed within container 18 and wets the entire inner surface of container 18 and by mass adhesion provides an adhesive force binding the liquid and the container 18. A low pressure seal is provided by the thorough wetting of the container 18 causing the upper section 21 of the container 18 to follow the liquid surface of liquid 34 and contain the liquid in a vessel of varying volume. The liquid 34 without the influence of adhesive properties would assume the shape of a perfect sphere, therefore, by utilizing the property of adhesion and container 18, stable orientation of the liquid 34 is accomplished. The liquid once located will remain located because of the force of adhesion unless some force causes it to move, for example, a pressure differential across upper section 21 of container 18.

Reorientation of liquid will only exist where liquid-gas displacement is possible. If the gas volume is small enough so that the true condition of liquid orientation is not altered then no adverse effect will result. Therefore, the heat input into the liquid 34 must be reduced to a minimum. Heat will reach the liquid 34 in four different ways, radiant heat input from the outer container 12 to the inner container 11, heat input by gas conduction through evacuated chamber 14, heat conduction through the fittings for liquid port 15, gas port 16, and the mounting (not shown) for container 10, and heat conduction from the gas 37 disposed between inner container 11 and the upper section 21 of container 18.

A detrimental amount of heat is prevented from reaching liquid oxygen 34 by advantageously employing the surface tension and, therefore, the capillary property of the liquid 34 and physical properties of semi-permeable container 18. Liquid oxygen 34 will wet the outer surface of container 18 thereby allowing vaporization because of heat input to occur outside of container 18. The outside surface of container 18 is wetted in two ways, by liquid 34 permeating through container 18 and by liquid leakage, that is, leakage through the fitting (not shown) around liquid port 15, and liquid leakage due to the fastening device 22. Liquid oxygen 34 will by capillary action permeate through inner layer 36 (FIG. 2) which is a felt of a synthetic resin. Liquid 34 by capillary action will pass through small passages in middle layer 38 which is a laminated synthetic resin and then permeate through outer layer 35. Additional liquid 34 will permeate through outer layer 35 by capillary action through the fittings surrounding inlet port 15 and as a result of liquid leakage around clamping device 22. Therefore, a blanket of liquid oxygen will form around semi-permeable container 18, that is, on the outer surface of upper section 21 and at the inner face of lower section 19 and inner container 11.

Heat reaching the semi-permeable container 18 in the manner described above will vaporize the liquid which has wet the outer surface of container 18. The vaporized gas is prevented from passing into container 18 by the liquid film (a low pressure liquid seal) on the outside of the container. The gas evaporation at the interface of lower section 19 and inner wall 20 will pass through outer layer 35 of lower section 19 into the gas area above upper section 21. As the liquid is vaporized from the wetted outer surface of semi-permeable container 18 due to heat input, liquid is resupplied to outer surface by capillary action thus maintaining a wetted surface at all times and thereby preventing any appreciable amount of heat reaching the liquid oxygen 34 inside of semi-permeable container 18.

Pressure opening and closing valve 56 has a build-up inlet port 58, build-up outlet port 59 and gas supply port 60 which are in fluid communication by means of pressure chamber 61. Pressure closing valve head 62 closes to prevent the flow of fluid from port 58 through chambert 61 to port 59 when a predetermined pressure in chamber 61 is reached. Build-up outlet port 59 is in fluid communication with build-up port 51 of fill, build-up, vent, and relief valve 40 by means of tubing 63. Pressure opening valve head 64 opens to permit the flow of fluid from port 59 through chamber 61 to port 60 when a predetermined pressure in chamber 61 is reached.

The liquid oxygen system comprises a novel flow scheme to overcome the difficulties encountered in a zero gravity environment. Liquid port 15 of liquid oxygen container 10 is in communication with gas port 16 of container 10 by means of an external build-up circuit. Liquid port 15 is connected to liquid check valve 65 by means of tubing 66. Reverse flow through valve 65 is prevented by means of liquid check valve head 68. Liquid flowing through liquid check valve 65 passes into pressure build-up heat exchanger 69 and from exchanger 69 by means of tubing 70 to gas check valve 71. Reverse flow through valve 71 is prevented by means of gas check valve head 72. Gas check valve 71 is in fluid communication with build-up inlet port 58 of pressure opening and closing valve 56 by means of tubing 74. The external build-up circuit comprises liquid port 15, tubing 66, check valve 65, heat exchanger 69, tubing 70, check valve 71, pressure opening and closing valve 56, tubing 63, fill, build-up, vent, and relief valve 40, tubing 50, and gas port 16. Check valves 65 and 71 are of the low pressure differential type for the purpose of preventing reversal of fluid flow.

Gas supply port 60 of pressure opening and closing valve 56 is in communication with supply heat exchanger 75 by means of tubing 76. Differential check valve 78 is in communication with tubing 70 and tubing 76 and check valve head 79 prevents the flow of fluid therebetween unless a pressure drop exists from tubing 70 to tubing 76. Supply heat exchanger 75 is in gas communication with gas regulating device 80 by means of tubing 81. Relief valve 82 is in communication with tubing 81 having relief valve head 84 for fluid restriction therethrough.

By means of semi-permeable container 18, check valves 65, 71, and 78 pressure build-up of the system is assured when the liquid to gas system is disposed in a zero gravity environment. Container 18 insures that the liquid oxygen 34 is exposed to liquid port 15 under all environmental conditions, when a pressure differential exists across the upper section 21 of container 18 liquid will be forced through port 15.

For the purpose of illustrating the operation of the novel liquid to gas conversion system, various pressures will be used. These pressures are not to be construed to define the limits of the invention, a wide range of pressures may be used which are within the scope of the novel liquid to gas conversion system.

In operation of the liquid to gas conversion system shown in FIG. 1 when the system is to be used to supply breathing oxygen, liquid fill port 41 is connected to a liquid oxygen supply. Liquid valve head 44 opens and liquid flows through liquid outlet port 42, tubing 45 and into liquid oxygen container 10 through liquid port 15. As liquid enters container 18 it is warmed and evaporates and displaces the collapsed upper section 21 of flexible semi-permeable container 18. When the container 10 is lowered to a temperature sufficient to prevent further evaporation of the liquid oxygen, the liquid will begin to fill the container 18. The pressure in container 18 will rise until 12 p.s.i.g. differential check valve 24 opens allowing gas to pass through relief port 29, gas port 16, tubing 50, gas port 46, past open build-up and vent valve head 49 and through vent port 48 to the ambient air. When liquid has filled the container 18 the liquid supply is removed and liquid valve head 44 and build-up and vent valve head 49 close therefore placing fill, build-up, and vent valve 40 in the build-up position.

The liquid oxygen 34 has wet the entire inner surface of flexible semi-permeable container 18. The outer surface of container 18 will also be wetted by reason of the capillary action through container 18, and leakage through the fittings surrounding liquid port 15 and leakage due to fastening device 22, in addition liquid may have reached the outside of container 18 on filling by means of an overflow through differential check valve 24.

With fill, build-up, vent, and relief valve 40 in the "build-up" position, there is a direct external communication, build-up circuit, between liquid port 15 and gas port 16 of container 10. Pressure closing valve head 62 will be open and will remain open until a pressure of 50 p.s.i.g. is reached thereby closing valve head 62 and preventing further external communication between liquid port 15 and gas port 16. Liquid check valve 65 and gas check valve 71 in the build-up circuit are designed to operate on a 2 inches of water pressure differential. In a gravity environment the liquid to gas system will build up pressure as present systems do. Liquid check valve 65 requires only a small amount of the head pressure available to start the build-up circuit.

The liquid to gas conversion system is ready to supply oxygen gas to the gas regulating device 80 when the pressure in the system is at or above 50 p.s.ig. Check valve 78 is set to operate on a 5 p.s.i.g. differential whereupon normally closed check valve head 79 will open.

When there is no gas demand by the gas regulating device 80 pressure will continue to build up in the system as the liquid 34 is vaporized in liquid oxygen container 11, this build-up will occur in both a gravity and a zero gravity environment. When the pressure in the system rises above 55 p.s.i.g. normally closed pressure opening valve head 64 will open. The economy circuit (container 10, tubing 50, valve 40, tubing 63, valve 56, tubing 76, heat exchanger 75, and tubing 81) is now open which provides a direct gas flow passage from the top of container 10 to the gas regulating device 80. The gas pressure in the system will continue to build up until a pressure of 110 p.s.i.g. is reached when the normally closed relief valve heads 55 and 84 will open and vent the gas to the ambient air and maintain the pressure in the system at a maximum of 110 p.s.i.g.

An oxygen demand, as sensed by gas regulating device 80 when the pressure in the system is between 55 and 110 p.s.i.g., will not alter the steady state of the system. The oxygen supplied will be the oxygen represented by the pressure in excess of 55 p.s.i.g.

When the pressure in the system drops to 55 p.s.i.g. the pressure opening valve head 64 of pressure opening and closing valve 56 will close. As the demand for oxygen continues as sensed by gas regulating device 80 and the pressure drops to 50 p.s.i.g., differential check valve head 79 will open. The pressure decrease is reflected back to the liquid oxygen 34 in semi-permeable container 18. A pressure differential is created across the upper section 21 of semi-permeable container 18 thereby forcing the liquid 34 through liquid port 15 to be vaporized and warmed in the the supply line (tubing 66, valve 65, heat exchanger 69, tubing 70, valve 78, tubing 76, heat exchanger 75, tubing 81) for use at regulating device 80.

When the demand at gas regulating device 80 is satisfied, differential check valve head 79 will close. If the use has caused the pressure within semi-permeable container 18 to fall below 50 p.s.i.g. pressure closing valve head 62 will open. Any liquid oxygen in the supply line will evaporate and pass to the top of container 10 creating a pressure differential across upper section 21 of semi-permeable container 18 thereby forcing additional liquid into the build-up circuit. This liquid will vaporize and pass to the top of container 10 and thus force additional liquid into the build-up circuit. This process will be repeated until the system pressure reaches 50 p.s.i.g. when pressure closing valve head 62 will close. The pressure across upper section 21 is stabilized and the system is ready for operation.

While the liquid to gas conversion system as shown in the drawing is of the construction shown and described, it is understood that the instant invention is not limited to any particular form or construction. Moreover, other changes and modifications of the novel liquid to gas conversion system contemplated herein may be made by those skilled in the art without departing from the scope of the instant invention.

I claim:

1. A liquid to gas conversion system for breathing purposes responsive to a breathing demand and operable in normal and zero gravity environments having multi-attitude capabilities comprising a liquid storage vessel having an inner vessel and an outer vessel forming an evacuated chamber, a flexible semi-permeable container disposed in said inner vessel comprising a lower section lining the lower portion of said inner vessel and an upper section movable in said inner vessel with the liquid level therein, means for withdrawing said liquid from said flexible semi-permeable container at a rate commensurate with said breathing demand, means for evaporating and warming said liquid withdrawn from said semi-permeable container.

2. The invention defined in claim 1 wherein said flexible semi-permeable container comprises outer layers of a felt of synthetic resin bonded to an inner sheet of synthetic resin.

3. The invention defined in claim 2 wherein said synthetic resin is tetrafluoroethylene.

4. A liquid oxygen to gaseous oxygen conversion system responsive to a breathing demand for use in a zero gravity environment comprising a storage vessel having an inner vessel and an outer vessel forming an evacuated chamber, a flexible semi-permeable container disposed in said storage vessel comprising a lower section lining the lower portion of said inner vessel and an upper section movable in said inner vessel with the liquid oxygen level therein, means for biasing said upper and lower section at their periphery to said inner vessel, means responsive to a gaseous oxygen breathing demand for reducing the pressure within said flexible semi-permeable container and permitting the flow of liquid oxygen from said flexible container, means for evaporating and warming said liquid withdrawn from said flexible semi-permeable container.

5. In a universally orientatable liquid to gas container having an opening formed in a wall thereof, means for insuring that the liquid contents of said container are disposed adjacent said opening comprising a separator secured to the inner surface of said container to form separate compartments within said container, one including said opening, said separator having flexibility permitting flexure to alter the volume of said one compartment, and said separator comprising a material which is wetted by said liquid and is permeable by said liquid.

6. The invention defined in claim 5 including means for introducing vapors of said liquid into a compartment other than said one compartment in a quantity that increases as liquid is withdrawn from said one compartment.

7. A universally orientatable container for frigid liquid comprising an outer container having a liquid port and means for insuring that the liquid contents of said container are disposed adjacent said port including a flexible inner container for the liquid having an opening communicating with said liquid port and formed of a material which is flexible at the temperature of the liquid and collapsible upon a reduction of the volume of liquid, said material having an outer surface wettable by said liquid and further having sufficient permeability to insure that said outer surface will remain wet under the condition of maximum anticipated evaporization rate after said material has reached the temperature of said liquid.

8. The invention defined in claim 7 wherein said material has an inner surface sufficiently wettable by said liquid to insure its continual attraction into contact with the liquid body as the volume thereof is reduced.

9. The invention defined in claim 7 including means for expelling vapors of said liquid resulting from evaporation of said liquid in said inner container during filling, comprising a second opening in said inner container opening to the space between said inner and outer container and a relief valve in said opening.

10. A liquid oxygen to gaseous oxygen conversion system responsive to a gaseous oxygen breathing demand from a gas regulator for use under universally orientatable conditions and under a zero gravity environment comprising a storage vessel having a liquid port and a gas port, said storage vessel having an inner vessel and an outer vessel forming an evacuated chamber, a flexible semi-permeable container disposed in said storage vessel comprising a lower section lining the lower portion of said inner vessel and surrounding said liquid port and an upper section movable with the liquid oxygen level therein means for biasing said upper and lower section at their periphery to said inner vessel, means responsive to a gaseous oxygen breathing demand for reducing the pressure within said flexible semi-permeable container and permitting the flow of liquid oxygen from said flexible container comprising a supply line joining said liquid port and said gas regulator, a low pressure differential pressure check valve disposed in said supply line and adjacent said liquid port, and a differential pressure check valve in said supply line, means for evaporating and warming said liquid withdrawn from said flexible semi-permeable container including a heat exchanger disposed in said supply line between said check valves and a heat exchanger disposed in said supply line between said differential pressure check valve and said gas regulator, a low pressure differential pressure check valve means in communication with said supply line for preventing gas flow into said semi-permeable container.

11. In a universally orientatable liquid oxygen to gaseous oxygen conversion system having a container for said liquid oxygen comprising a liquid oxygen opening in said container, means for insuring that said liquid oxygen disposed in said container is adjacent said opening comprising a flexible semi-permeable container comprising three layers, an inner layer of a film of a synthetic resin and outer layers of a felt of a synthetic resin said semi-permeable container including two substantially hemispherical sections joined at their periphery, one of said hemispherical sections surrounding said opening and including said opening and the second of said hemispherical sections movable toward said opening with the varying volume of liquid oxygen contained therein and forming two separate compartments within said container, said flexible semi-permeable container having the physical properties to permit the liquid oxygen to wet both sides thereof.

12. The invention defined in claim 11 including means for relieving the pressure within said flexible container when a predetermined pressure differential exists between said compartments.

References Cited in the file of this patent

UNITED STATES PATENTS

| | | |
|---|---|---|
| 1,229,011 | Amsbary et al. | June 5, 1917 |
| 1,596,385 | Wilson | Aug. 17, 1926 |
| 2,432,025 | Lorenz | Dec. 2, 1947 |
| 2,543,585 | Miller | Feb. 27, 1951 |
| 2,576,985 | Wildhack | Dec. 4, 1951 |
| 2,970,452 | Beckman et al. | Feb. 7, 1961 |

OTHER REFERENCES

"Advances in Cryogenic Engineering," Timmerhaus, published by Plenum Press, Incorporated, New York, 1960, Proceedings of the 1959 Cryogenic Engineering Conference, pages 100–101 relied on.